United States Patent
Seo et al.

(10) Patent No.: US 10,193,643 B2
(45) Date of Patent: Jan. 29, 2019

(54) METHOD FOR REPORTING CHANNEL STATE INFORMATION ON UNLICENSED BAND IN WIRELESS COMMUNICATION SYSTEM AND APPARATUS FOR SAME

(71) Applicant: LG ELECTRONICS INC., Seoul (KR)

(72) Inventors: Hanbyul Seo, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 11 days.

(21) Appl. No.: 15/322,942

(22) PCT Filed: Jul. 13, 2015

(86) PCT No.: PCT/KR2015/007236
§ 371 (c)(1),
(2) Date: Dec. 29, 2016

(87) PCT Pub. No.: WO2016/006979
PCT Pub. Date: Jan. 14, 2016

(65) Prior Publication Data
US 2017/0141859 A1     May 18, 2017

Related U.S. Application Data

(60) Provisional application No. 62/023,194, filed on Jul. 11, 2014.

(51) Int. Cl.
*H04W 16/14*     (2009.01)
*H04W 24/08*     (2009.01)
(Continued)

(52) U.S. Cl.
CPC ......... *H04B 17/345* (2015.01); *H04B 7/0626* (2013.01); *H04B 17/24* (2015.01); *H04W 16/14* (2013.01); *H04W 24/08* (2013.01)

(58) Field of Classification Search
CPC ..... H04B 17/345; H04B 17/24; H04W 16/14; H04W 24/08; H04W 52/52;
(Continued)

(56) References Cited

U.S. PATENT DOCUMENTS

2013/0272229 A1   10/2013   Dinan
2013/0315114 A1   11/2013   Seo et al.
(Continued)

FOREIGN PATENT DOCUMENTS

CN     101641986 A     2/2010
EP     2642810 A1      9/2013
(Continued)

*Primary Examiner* — Awet Haile
(74) *Attorney, Agent, or Firm* — Birch, Stewart, Kolasch & Birch, LLP

(57) ABSTRACT

The present application discloses a method for reporting channel state information on an unlicensed band to a base station by a terminal. Specifically, the method comprises: a step for receiving, from the base station, a triggering message of a seconding reference signal for reporting the channel state information of the unlicensed band; a step for measuring an interference in the unlicensed band; and if the interference measured in the unlicensed band is below a threshold, a step for transmitting the sounding reference signal for reporting the channel state information of the unlicensed band to the base station, according to the triggering message.

10 Claims, 15 Drawing Sheets

(51) Int. Cl.
*H04B 17/345* (2015.01)
*H04B 17/24* (2015.01)
*H04B 7/06* (2006.01)

(58) Field of Classification Search
CPC ........... H04W 74/0808; H04W 76/025; H04W 76/046; H04W 76/068; H04W 76/15; H04W 76/27; H04W 76/38; H04L 5/001; H04L 5/0098
See application file for complete search history.

(56) References Cited

U.S. PATENT DOCUMENTS

2013/0322277 A1* 12/2013 Vanganuru ............ H04W 24/08
                                                     370/252
2014/0016475 A1*  1/2014 Zhou ................. H04W 72/1242
                                                     370/236
2014/0146770 A1   5/2014 Iwai et al.
2015/0327233 A1* 11/2015 Liu ................... H04W 56/0015
                                                     370/329

FOREIGN PATENT DOCUMENTS

| EP | 3169005 A1 | 5/2017 |
| EP | 2140707 B1 | 8/2017 |
| TW | 201407982 A | 2/2014 |
| WO | WO 2013/167557 A1 | 11/2013 |
| WO | WO 2013/179095 A1 | 12/2013 |

* cited by examiner

FIG. 2
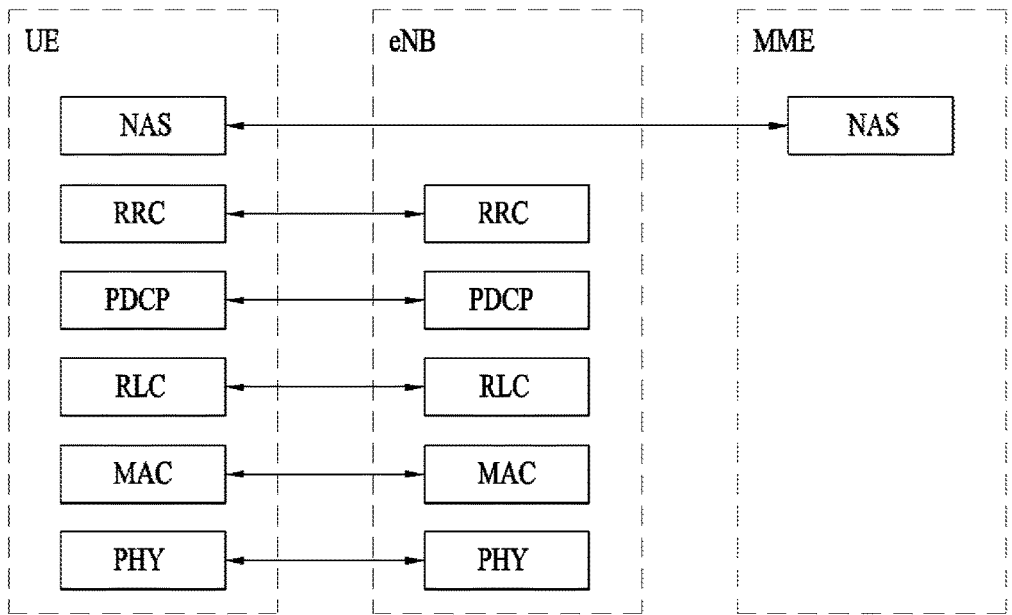
(A) CONTROL-PLANE PROTOCOL STACK
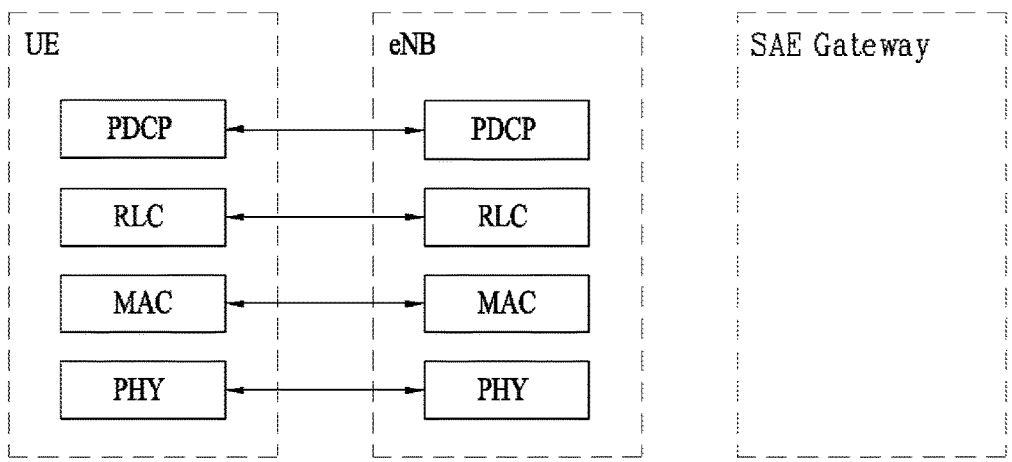
(B) USER-PLANE PROTOCOL STACK

METHOD FOR REPORTING CHANNEL STATE INFORMATION ON UNLICENSED BAND IN WIRELESS COMMUNICATION SYSTEM AND APPARATUS FOR SAME

CROSS REFERENCE TO RELATED APPLICATIONS

This application is the National Phase of PCT International Application No. PCT/KR2015/007236, filed on Jul. 13, 2015, which claims priority under 35 U.S.C. 119(e) to U.S. Provisional Application No. 62/023,194, filed on Jul. 11, 2014, all of which are hereby expressly incorporated by reference into the present application.

TECHNICAL FIELD

The present invention relates to a wireless communication system, and more particularly, to a method of reporting channel state information on an unlicensed band in a wireless communication system and an apparatus therefor.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF THE INVENTION

Technical Task

Based on the aforementioned discussion, the present invention intends to propose a method of reporting channel state information on an unlicensed band in a wireless communication system and an apparatus therefor in the following description.

Technical Solution

To achieve these and other advantages and in accordance with the purpose of the present invention, as embodied and broadly described, according to one embodiment, a method of reporting channel state information on an unlicensed band, which is reported by a user equipment to an eNB in a wireless communication system, includes the steps of receiving a triggering message of a sounding reference signal from the eNB to report the channel state information on the unlicensed band, measuring interference on the unlicensed band, and if the interference measured on the unlicensed band is less than a threshold value, transmitting the sounding reference signal for reporting the channel state information on the unlicensed band to the eNB according to the triggering message.

To further achieve these and other advantages and in accordance with the purpose of the present invention, according to a different embodiment, a user equipment in a wireless communication system includes a wireless communication module configured to transceive a signal with an eNB, and a processor configured to process the signal, the processor configured to receive a triggering message of a sounding reference signal from the eNB to report channel state information on an unlicensed band, the processor configured to measure interference on the unlicensed band, the processor, if the interference measured on the unlicensed band is less than a threshold value, configured to control the wireless communication module to transmit the sounding reference signal for reporting the channel state information on the unlicensed band to the eNB according to the triggering message.

Preferably, if the interference measured on the unlicensed band is equal to or greater than the threshold value, transmission of the sounding reference signal for reporting the channel state information on the unlicensed band is dropped.

Preferably, if a different eNB detects the sounding reference signal for reporting the channel state information on the unlicensed band, downlink transmission of the different eNB on the unlicensed band is terminated for a predetermined period.

More preferably, if the sounding reference signal for reporting the channel state information on the unlicensed band is received, the eNB performs downlink transmission to the user equipment on the unlicensed band. In this case, the sounding reference signal for reporting the channel state information on the unlicensed band applies an additional timing advance to a timing advance for uplink transmission to perform downlink transmission processing in the eNB.

Advantageous Effects

According to embodiments of the present invention, it is able to more efficiently feedback channel state information on an unlicensed band in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram illustrating structures of a control plane and a user plane of a radio interface protocol between a user equipment and E-UTRAN based on the 3GPP radio access network standard;

BEST MODE

Mode for Invention

Figure 1:
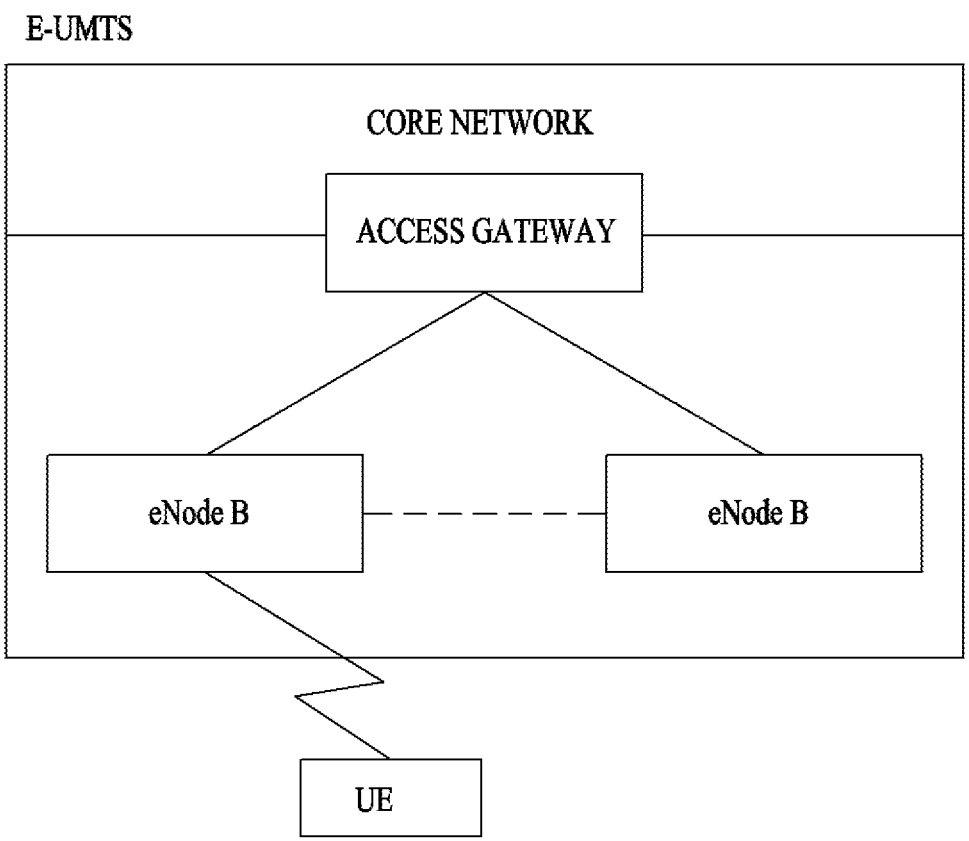
FIG. 1 is a schematic diagram of E-UMTS network structure as one example of a wireless communication system.

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

In the present specification, a name of a base station can be used as a comprehensive terminology including an RRH (remote radio head), an eNB, a TP (transmission point), an RP (reception point), a relay, and the like.

FIG. 2 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. If there is RRC connection between a user equipment and an RRC layer of a network, the user equipment is in an RRC connected mode. Otherwise, the user equipment is in an RRC idle mode. A NAS (non-access stratum) layer, which is located at the top of the RRC layer, performs such a function as session management and mobility management.

One cell constituting a base station (eNB) is set to one of bandwidths of 1.4, 3.5, 5, 10, 15, and 20 MHz and provides a downlink or uplink transmission service to several user equipments. At this time, different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH). Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 3:
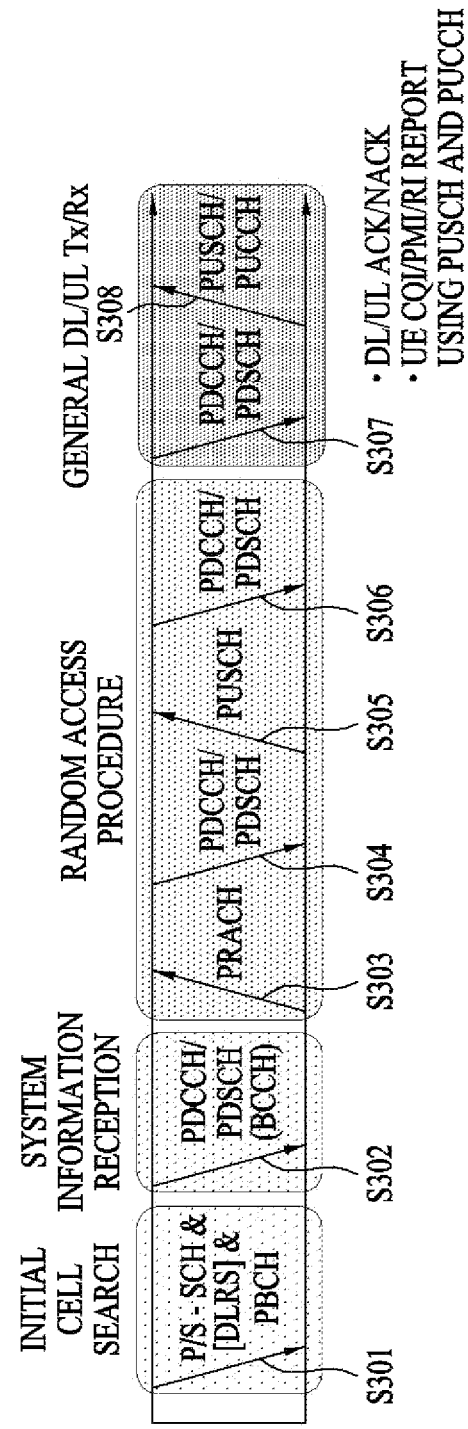
FIG. 3 is a diagram illustrating physical channels used in a 3GPP LTE system and a general method for transmitting a signal using the physical channels.

FIG. 3 is a diagram showing physical channels used in a 3GPP system and a general signal transmission method using the same.

When a UE is powered on or enters a new cell, the UE performs an initial cell search operation such as synchronization with an eNB (S301). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S302).

When the UE initially accesses the eNB or has no radio resources for signal transmission, the UE may perform a random access procedure (RACH) with respect to the eNB (steps S303 to S306). To this end, the UE may transmit a specific sequence as a preamble through a physical random access channel (PRACH) (S303 and S305) and receive a response message to the preamble through the PDCCH and the PDSCH corresponding thereto (S304 and S306). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S308), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
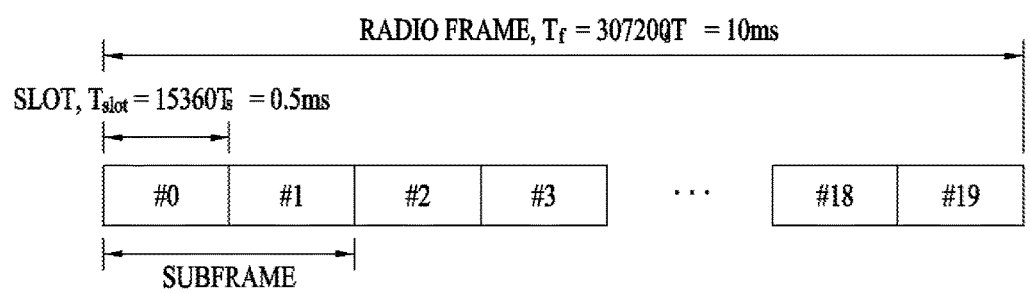
FIG. 4 is a diagram illustrating a structure of a radio frame used in an LTE system.

FIG. 4 is a diagram for a structure of a radio frame used in an LTE system.

Referring to FIG. 4, one radio frame has a length of 10 ms $(327{,}200 \times T_S)$ and is constructed with 10 subframes in equal size. Each of the subframes has a length of 1 ms and is constructed with two slots. Each of the slots has a length of 0.5 ms $(15{,}360 \times T_S)$. In this case, $T_s$ indicates a sampling time and is represented as $T_s = 1/(15 \text{ kHz } 2048) = 3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
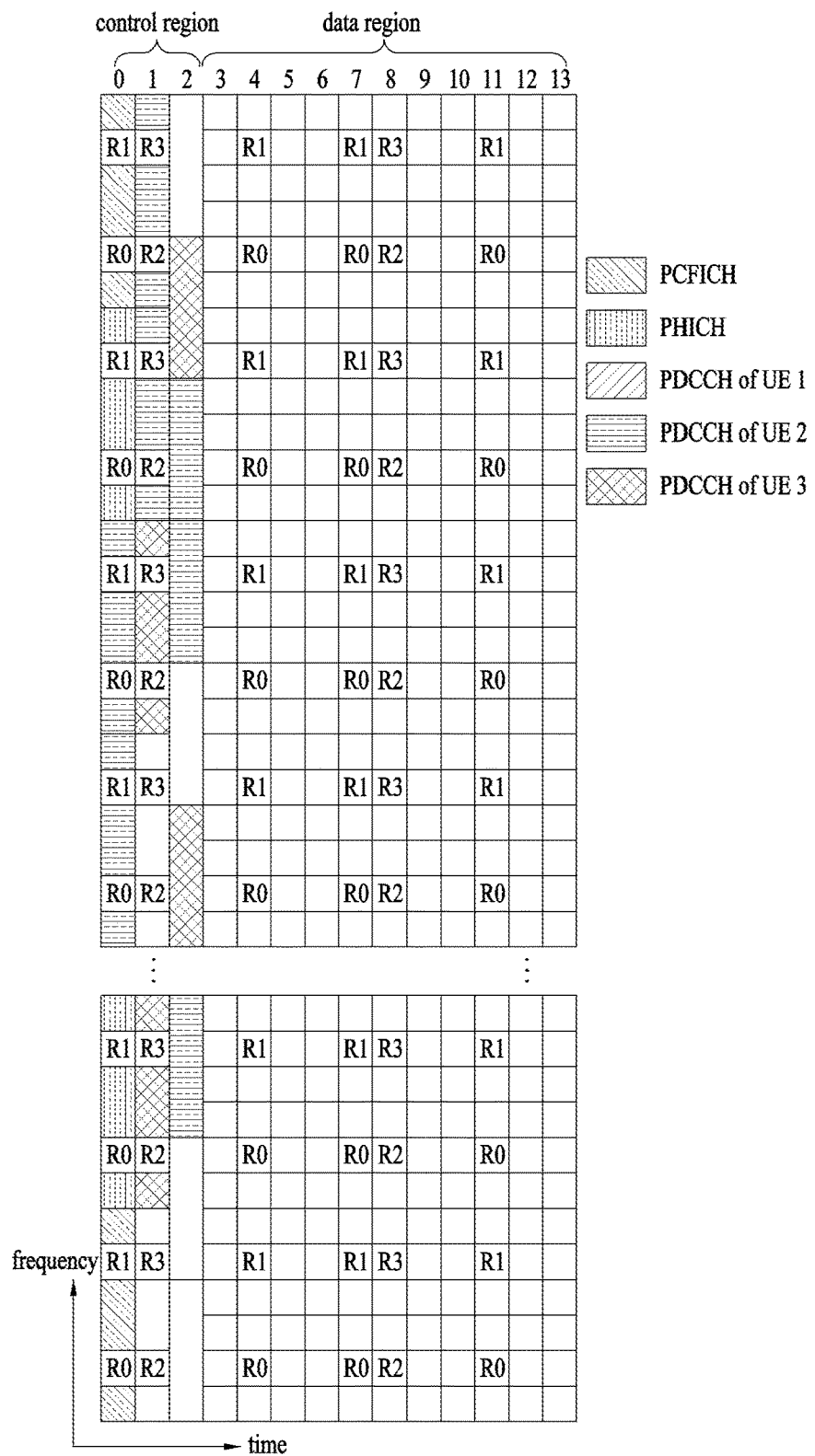
FIG. 5 is a diagram illustrating a structure of a downlink radio frame used in an LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
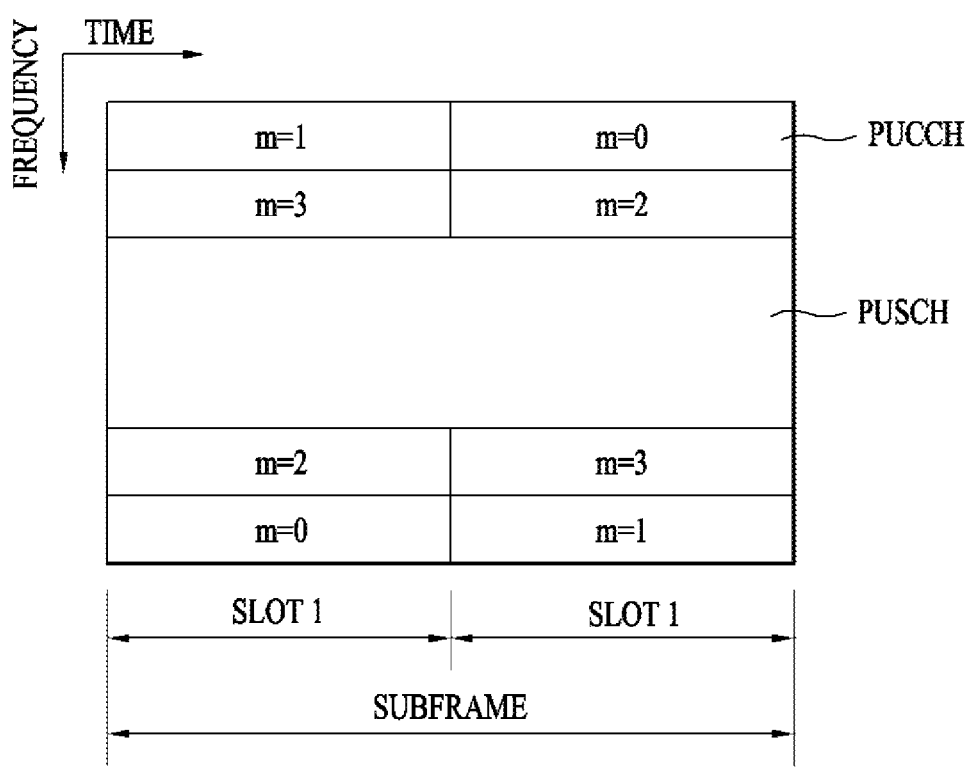
FIG. 6 is a diagram illustrating a structure of an uplink subframe used in an LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

In the following, CSI (channel state information) reporting is explained. In current LTE standard, there exist two transmission schemes including open loop MIMO which is managed without channel information and closed loop MIMO which is managed based on channel information. In the closed loop MIMO, each of an eNB and a UE performs beamforming based on channel information to obtain a multiplexing gain of MIMO antenna. In order to obtain CSI from the UE, the eNB transmits a reference signal to the UE and commands the UE to feedback CSI measured based on the reference signal via PUCCH (physical uplink control channel) or PUSCH (physical uplink shared channel).

The CSI is mainly classified into RI, PMI, and CQI information. The RI (rank indicator) indicates rank information of a channel and the number of streams received by a UE through an identical frequency-time resource. Since the RI is dominantly determined by long term fading of a channel, the RI is fed back to the eNB from the UE with an interval longer than intervals of the PMI and the CQI in general.

The PMI (precoding matrix index) corresponds to a value to which a spatial characteristic of a channel is reflected. The PMI indicates a precoding matrix index of an eNB preferred by a UE on the basis of a metric such as SINR and the like. The CQI corresponds to a value indicating strength of a channel. In general, the CQI indicates reception SINR capable of being obtained when an eNB uses the PMI.

Figure 7:
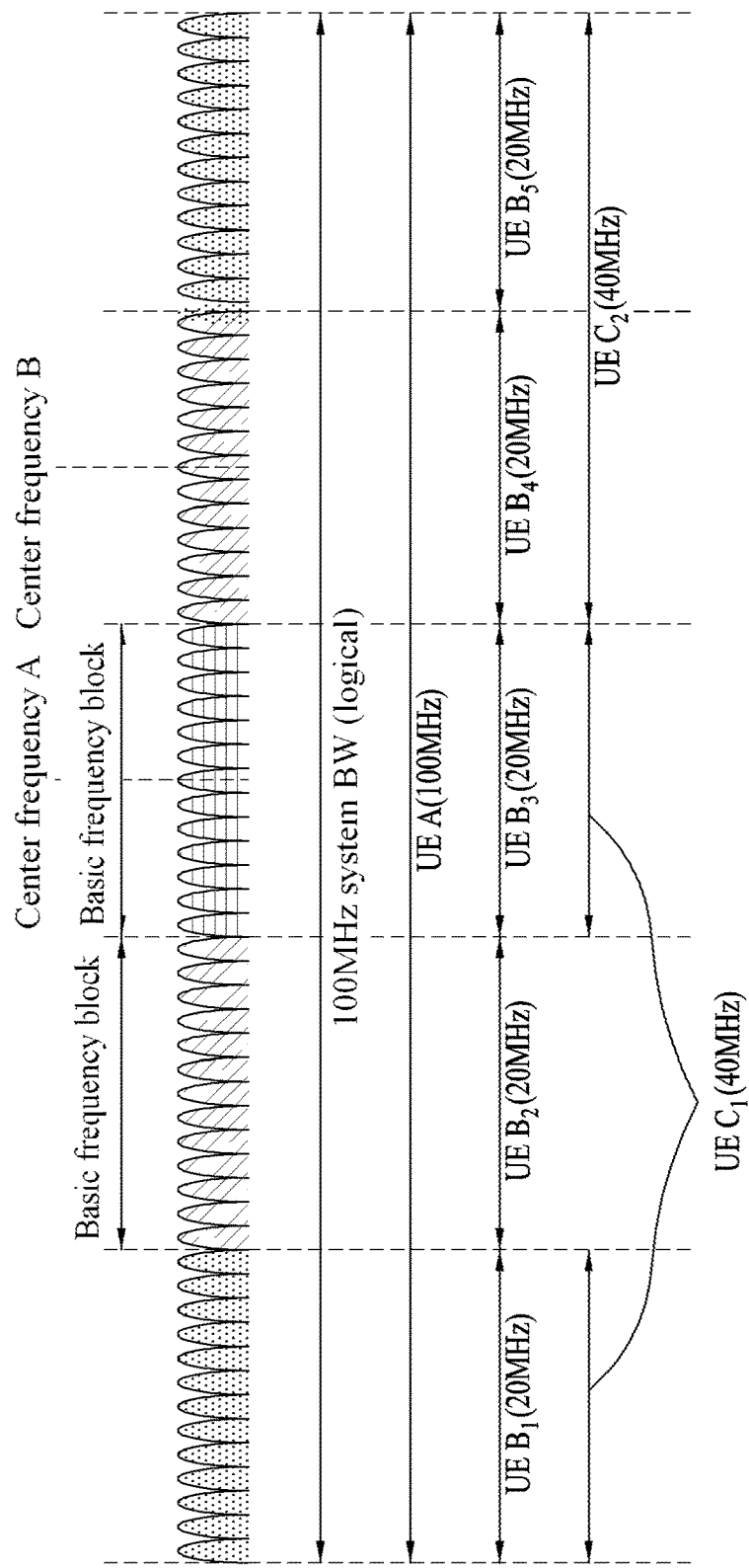
FIG. 7 is a conceptual diagram for explaining carrier aggregation.

In the following, a carrier aggregation scheme is described. FIG. 7 is a conceptual diagram for explaining carrier aggregation.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' is consistently used.

Referring to FIG. 7, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 7 illustrates the case in which component carriers have the same bandwidth, the case is purely exemplary, and thus, the component carriers may have different bandwidths. In addition, although FIG. 7 illustrates the case in which the component carriers are adjacent to each other in the frequency domain, FIG. 7 are logically illustrated, and thus, the component carriers may be physically adjacent to each other or may be spaced apart from each other.

Component carriers can use different center frequencies or use one common center frequency with respect to physically adjacent component carriers. For example, in FIG. 7, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

Figure 8:
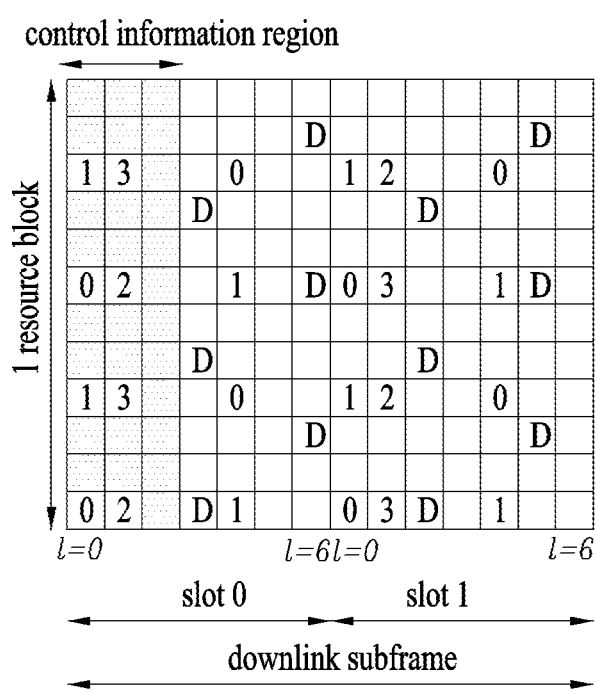
FIGS. 8 and 9 are diagrams for a structure of a downlink reference signal in LTE system supporting downlink transmission using 4 antennas.

An LTE system may use one downlink component carrier and one uplink component carrier, whereas an LTE-A system may use a plurality of component carriers as illustrated in FIG. 8. A downlink component carrier or a combination of the downlink component carrier and a uplink component carrier corresponding to the downlink component carrier may be referred to as a cell. A corresponding relation between a downlink component carrier and an uplink component carrier can be indicated via system information.

In this case, a method for scheduling a data channel by a control channel may be classified into a linked carrier scheduling method and a cross carrier scheduling method.

More specifically, in the linked carrier scheduling method, a control channel transmitted through a specific component carrier schedules only a data channel through the specific component carrier like in a legacy LTE system using a single component carrier. In particular, a downlink grant/uplink grant transmitted to PDCCH region of a downlink component carrier of the specific component carrier (or specific cell) can schedule only PDSCH/PUSCH of a cell to which the downlink component carrier belongs thereto. In particular, a search space corresponding to a region for attempting to detect the downlink grant/uplink grant exists at a PDCCH region of a cell at which PDSCH/PUSCH corresponding to a scheduling target is located.

Meanwhile, in the cross carrier scheduling method, a control channel transmitted through a primary component carrier (primary CC) using a carrier indicator field (CIF) schedules a data channel transmitted through the primary CC or a different CC. In other word, in the cross carrier scheduling method, a monitored cell (or a monitored CC) is set and a downlink grant/uplink grant transmitted in PDCCH region of the monitored cell schedules PDSCH/PUSCH of a cell configured to be scheduled in the cell. In particular, a search space for a plurality of component carriers exists at PDCCH region of the monitored cell. The Pcell is set among a plurality of the cells to transmit system information, attempt initial access, and transmit uplink control information. The Pcell includes downlink primary component carrier and an uplink primary component carrier corresponding to the downlink primary component carrier.

In the following, a reference signal is explained in more detail.

In general, in order to measure a channel, a reference signal already known to both a transmitting end and a receiving end is transmitted to the receiving end from the transmitting end together with data. The reference signal plays a role in performing a demodulation process by notifying not only channel measurement but also a modulation scheme. A reference signal is classified into a dedicated reference signal (DRS) for an eNB and a specific UE and a cell-specific reference signal or a common reference signal (common RS or cell-specific RS (CRS)). And, the cell-specific reference signal includes a reference signal for measuring CQI/PMI/RI and reporting the CQI/PMI/RI to an eNB. The reference signal is referred to as a CSI-RS (channel state information-RS).

Figure 9:
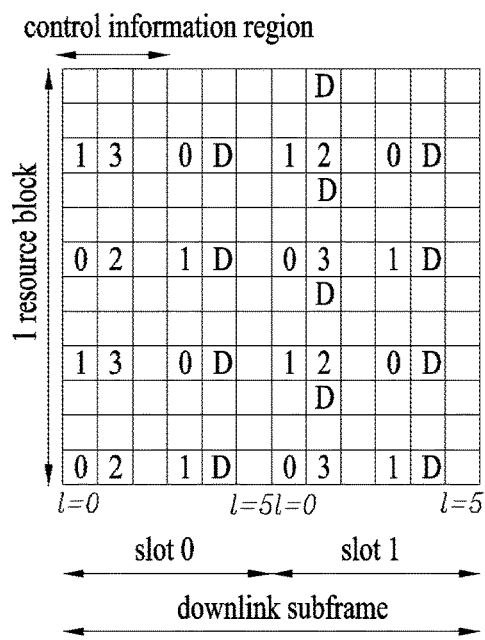

FIGS. 8 and 9 are diagrams for a structure of a downlink reference signal in LTE system supporting downlink transmission using 4 antennas. In particular, FIG. 8 shows a case of a normal cyclic prefix and FIG. 9 shows a case of an extended cyclic prefix.

Referring to FIGS. 8 and 9, 0 to 3 written on a grid corresponds to a CRS (common reference signal) which is a cell-specific reference signal transmitted to perform channel measurement and data demodulation in response to antenna ports 1 to 3. The cell-specific reference signal CRS can be transmitted to a UE not only over a data information region but also over a control information region.

And, 'D' written on a grid corresponds to a downlink DM-RS (demodulation-RS) which is a UE-specific RS and the DM-RS supports single antenna port transmission via a data region, i.e., PDSCH. Information on whether or not there exists the DM-RS corresponding to the UE-specific RS is signaled to a UE via higher layer. FIGS. 8 and 9 shows an example of a DM-RS corresponding to an antenna port 5. 3GPP standard document 36.211 also defines DM-RSs for antenna ports 7 to 14, i.e., 8 antenna ports in total.

Figure 10:
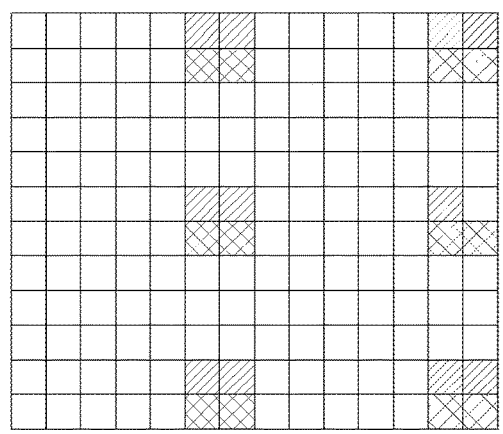
FIG. 10 is a diagram for an example of allocating a downlink DM-RS defined in current 3GPP standard document.

FIG. 10 is a diagram for an example of allocating a downlink DM-RS defined by current 3GPP standard document.

Referring to FIG. 10, DM-RSs corresponding to antenna ports {7, 8, 11, 13} are mapped to a DM-RS group 1 using a sequence per antenna port and DM-RSs corresponding to antenna ports {9, 10, 12, 14} are also mapped to a DM-RS group 2 using a sequence per antenna port.

Meanwhile, the aforementioned CSI-RS is proposed to measure a channel on PDSCH irrespective of a CRS. Unlike the CRS, the CSI-RS can be defined by maximum 32 different resource configurations to reduce ICI (inter-cell interference) in multi-cell environment.

A CSI-RS (resource) configuration varies according to the number of antenna ports and it is able to configure a CSI-RS defined by a different (resource) configuration to be transmitted between neighboring cells. Unlike the CRS, the CSI-RS supports up to maximum 8 antenna ports. According to 3GPP standard document, total 8 antenna ports (antenna ports 15 to 22) are assigned for the CSI-RS. Tables 1 and 2 in the following show CSI-RS configurations defined in 3GPP standard document. In particular, Table 1 shows a normal CP case and Table 2 shows an extended CP case.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |

TABLE 1-continued

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
|  | 11 | (2, 5) | 0 | | | | |
|  | 12 | (5, 2) | 1 | | | | |
|  | 13 | (4, 2) | 1 | | | | |
|  | 14 | (3, 2) | 1 | | | | |
|  | 15 | (2, 2) | 1 | | | | |
|  | 16 | (1, 2) | 1 | | | | |
|  | 17 | (0, 2) | 1 | | | | |
|  | 18 | (3, 5) | 1 | | | | |
|  | 19 | (2, 5) | 1 | | | | |
| Frame structure type 2 only | 20 | (11, 1) | 1 | (11, 1) | 1 | (11, 1) | 1 |
|  | 21 | (9, 1) | 1 | (9, 1) | 1 | (9, 1) | 1 |
|  | 22 | (7, 1) | 1 | (7, 1) | 1 | (7, 1) | 1 |
|  | 23 | (10, 1) | 1 | (10, 1) | 1 | | |
|  | 24 | (8, 1) | 1 | (8, 1) | 1 | | |
|  | 25 | (6, 1) | 1 | (6, 1) | 1 | | |
|  | 26 | (5, 1) | 1 | | | | |
|  | 27 | (4, 1) | 1 | | | | |
|  | 28 | (3, 1) | 1 | | | | |
|  | 29 | (2, 1) | 1 | | | | |
|  | 30 | (1, 1) | 1 | | | | |
|  | 31 | (0, 1) | 1 | | | | |

TABLE 2

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
|  | 1 | (9, 4) | 0 | (9, 4) | 0 | (9, 4) | 0 |
|  | 2 | (10, 4) | 1 | (10, 4) | 1 | (10, 4) | 1 |
|  | 3 | (9, 4) | 1 | (9, 4) | 1 | (9, 4) | 1 |
|  | 4 | (5, 4) | 0 | (5, 4) | 0 | | |
|  | 5 | (3, 4) | 0 | (3, 4) | 0 | | |
|  | 6 | (4, 4) | 1 | (4, 4) | 1 | | |
|  | 7 | (3, 4) | 1 | (3, 4) | 1 | | |
|  | 8 | (8, 4) | 0 | | | | |
|  | 9 | (6, 4) | 0 | | | | |
|  | 10 | (2, 4) | 0 | | | | |
|  | 11 | (0, 4) | 0 | | | | |
|  | 12 | (7, 4) | 1 | | | | |
|  | 13 | (6, 4) | 1 | | | | |
|  | 14 | (1, 4) | 1 | | | | |
|  | 15 | (0, 4) | 1 | | | | |
| Frame structure type 2 only | 16 | (11, 1) | 1 | (11, 1) | 1 | (11, 1) | 1 |
|  | 17 | (10, 1) | 1 | (10, 1) | 1 | (10, 1) | 1 |
|  | 18 | (9, 1) | 1 | (9, 1) | 1 | (9, 1) | 1 |
|  | 19 | (5, 1) | 1 | (5, 1) | 1 | | |
|  | 20 | (4, 1) | 1 | (4, 1) | 1 | | |
|  | 21 | (3, 1) | 1 | (3, 1) | 1 | | |
|  | 22 | (8, 1) | 1 | | | | |
|  | 23 | (7, 1) | 1 | | | | |
|  | 24 | (6, 1) | 1 | | | | |
|  | 25 | (2, 1) | 1 | | | | |
|  | 26 | (1, 1) | 1 | | | | |
|  | 27 | (0, 1) | 1 | | | | |

Figure 11:
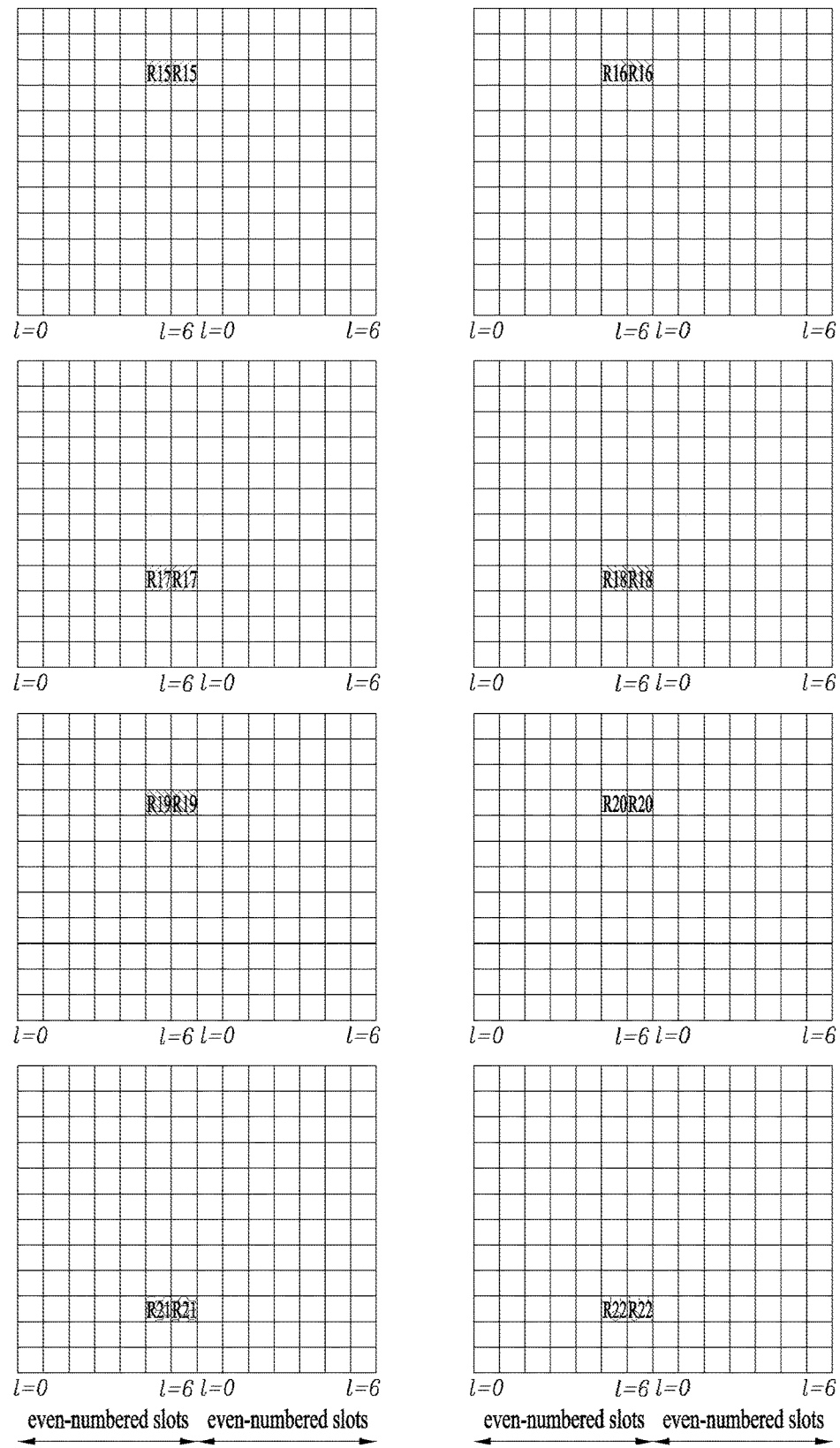
FIG. 11 is a diagram for a CSI-RS configuration #0 among downlink CSI-RS configurations defined in current 3GPP standard document when a normal CP is used.

In Tables 1 and 2, (k',l') corresponds to an RE index, k' corresponds to a subcarrier index, and l' corresponds to an OFDM symbol index. FIG. 11 illustrates a CSI-RS configuration #0 in case of a normal CP among CSI-RS configurations defined by a current 3GPP standard document.

And, it may be able to define a CSI-RS subframe configuration and the CSI-RS subframe configuration consists of a period ($T_{CSI-RS}$) represented by a subframe unit and a subframe offset ($\Delta_{CSI-RS}$). Table 3 in the following shows CSI-RS subframe configurations defined in 3GPP standard document.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

As shown in Table 4 in the following, information on a ZP (zero-power) CSI-RS is transmitted via an RRC layer signal in a manner of being included in a CSI-RS-Config-r10 message. In particular, a ZP CSI-RS resource configuration consists of zeroTxPowerSubframeConfig-r10 and zeroTxPowerResourceConfigList-r10 corresponding to a bitmap of a size of 16 bits.

In this case, the zeroTxPowerSubframeConfig-r10 indicates a period of the ZP CSI-RS and a subframe offset transmitted via $I_{CSI-RS}$ value corresponding to Table 3. And, the zeroTxPowerResourceConfigList-r10 corresponds to information for indicating ZP CSI-RS configuration. Each element of the bitmap indicates configurations included in a column that the number of antenna ports for a CSI-RS corresponds to 4 in Table 1 or Table 2. In particular, according to a current 3GPP standard document, a ZP CSI-RS is defined for a case that the number of antenna ports for a CSI-RS corresponds to 4 only.

TABLE 4

```
-- ASN1START
CSI-RS-Config-r10 ::=    SEQUENCE {
  csi-RS-r10                CHOICE {
    ...
  }
  zeroTxPowerCSI-RS-r10     CHOICE {
    release                   NULL,
    setup                     SEQUENCE {
      zeroTxPowerResourceConfigList-r10  BIT STRING (SIZE (16)),
      zeroTxPowerSubframeConfig-r10      INTEGER (0..154)
    }
  }
}
-- ASN1STOP
```

For reference, according to current 3GPP standard document, a CQI index, a modulation order corresponding to the CQI index, a coding rate, and the like are shown in Table 5 in the following.

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

It is necessary for a UE to calculate SINR as a factor necessary for calculating a CQI. In this case, reception power measurement (S-measure) of a desired signal can be performed using such an RS as an NZP CSI-RS and the like. In order to measure interference power (I-measure or IM (interference measurement)), power of an interference signal can be measured by eliminating the desired signal from the received signal.

Subframe sets $C_{CSI,0}$ and $C_{CSI,1}$ for measuring CSI can be signaled via higher layer signaling. A subframe corresponding to each of the subframe sets is included in a single set only without being overlapped with each other. In this case, a UE can perform the S-measure via such an RS as a CSI-RS without being restricted by a special subframe. Yet, in case of performing the I-measure, the UE individually performs the I-measure according to $C_{CSI,0}$ and $C_{CSI,1}$ to calculate two different CQIs for the $C_{CSI,0}$ and the $C_{CSI,1}$.

In the following, a method of transmitting and receiving a signal through an unlicensed band is explained.

Figure 12:
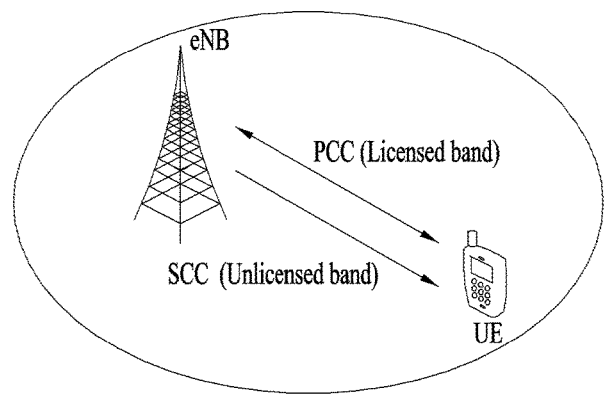
FIG. 12 is a diagram for an example of a carrier aggregation situation of a licensed band and an unlicensed band.

FIG. 12 is a diagram for an example of a carrier aggregation situation of a licensed band and an unlicensed band.

Referring to FIG. 12, an eNB can transmit a signal to a UE or the UE can transmit a signal to the eNB in a carrier aggregation situation of an LTE-A band corresponding to a licensed band and an unlicensed band. In the following description, for clarity, assume that the UE is configured to perform wireless communication through two component carriers in the licensed band and the unlicensed band, respectively. In this case, a carrier of the licensed band corresponds to a primary component carrier (primary CC (PCC) or Pcell) and a carrier of the unlicensed band corresponds to a secondary component carrier (secondary CC (SCC) or Scell). Yet, methods proposed by the present invention can also be extensively applied to a situation that a plurality of licensed bands and a plurality of unlicensed bands are used via carrier aggregation scheme. And, the methods can also be applied to a case that a signal is transceived between an eNB and a UE via an unlicensed band only.

If structures of a reference signal and an interference measurement resource used for PDSCH in current LTE system is used in an unlicensed band as it is, performance can be degraded. This is because not only LTE system but also a system of a different type such as WiFi or Bluetooth may exist in the unlicensed band and the LTE system should transmit and receive a signal via channel contention with the various systems. In general, channel contention uses such a principle as listen-before-talk. In particular, a specific device determines whether or not a different device occupies a channel and performs transmission before the specific device performs transmission. If it is determined that a current channel is idle, in other word, if it is determined as there is no transmission from a device adjacent to the specific device, the specific device initiates transmission of the specific device. Although the channel contention is performed, it is impossible to perfectly prevent a resource collision, which occurs due to the simultaneous transmission of two transmitting ends, by the dispersive channel contention. When two or more devices attempt to perform transmission at the same time, the possibility of affecting the two or more devices affected by strong interference still exists with at least a consistent probability. In particular, although a counterpart of the channel contention is a different system rather than LTE system or the counterpart of the channel contention corresponds to LTE system, if the counterpart is not a device belonging to an identical operator and the device managed together, the aforementioned resource collision may more frequently occur due to the deficiency of coordination between devices. When resource collision occurs, it may be difficult for a specific transmission device to identify whether or not transmission of the specific transmission device is interfered by a different device.

The aforementioned listen-before-talk principle is similar to CSI feedback-based link adaptation used in legacy cellular communication. In this case, the CSI feedback-based link adaptation can be performed in a manner that a UE measures a channel state (including both reception state of an eNB signal and examined interference state), reports CSI to the eNB, and the eNB performs appropriate scheduling based on the CSI. In general, if a UE examines very strong interference and reports a very low CSI value to the eNB, preferably, the eNB excludes the UE from scheduling. Hence, it might say that the principle itself of the legacy CSI feedback-based link adaptation naturally implements the principle of the listen-before-talk operation in an unlicensed band. In particular, if a UE measures strong interference caused by transmission of a different device and reports a low CSI to an eNB based on the interference, the eNB may terminate transmission. In particular, the transmission of the eNB can be determined according to whether or not a neighboring device performs transmission.

However, it is difficult to apply legacy CSI feedback as it is for channel contention in an unlicensed band where interference situation is very dynamically changing. This is because the legacy CSI feedback is designed to have relatively long processing time and feedback latency based on interference measured for relatively long time under an assumption that a network has minimum control capability for the interference situation. In particular, if a UE measures interference of specific timing only, since the UE may feedback CSI determined by such an instantaneous attribute as offered load, precoding, and the like of a device causing interference at the specific timing, it is difficult to represent CSI at the time of using a different attribute. Hence, the legacy CSI feedback is designed to calculate CSI based on interference measured for a long time. However, in case of CSI in an operation of an unlicensed band, the CSI may identify an instant attribute of an interfering device and may be able to report whether or not a channel of current timing is idle. In particular, the CSI may more correspond to the listen-before-talk principle.

In order to smoothly perform an operation in the aforementioned situation, a method of more quickly reporting CSI, which is measured for a shorter time (referred to as short-term CSI) compared to a legacy CSI, to an eNB is explained in the present invention.

<Measurement and Calculation of Short-Term CSI>

In order to distinguish short-term CSI proposed in the present invention, CSI obtained by measuring a channel and interference for relatively long time in a legacy cellular system is referred to as a long-term CSI.

First of all, the short-term CSI is distinguished from the long-term CSI in terms of an interference measurement resource region. The long-term CSI is calculated based on a value measured in time domain or frequency domain without any restriction. On the contrary, the short-term CSI is calculated based on a channel and/or interference measured in a relatively short period, in particular, in a period located at a region adjacent to the timing of reporting the short-term CSI. Regarding this, it shall be described with reference to the drawing.

Figure 13:
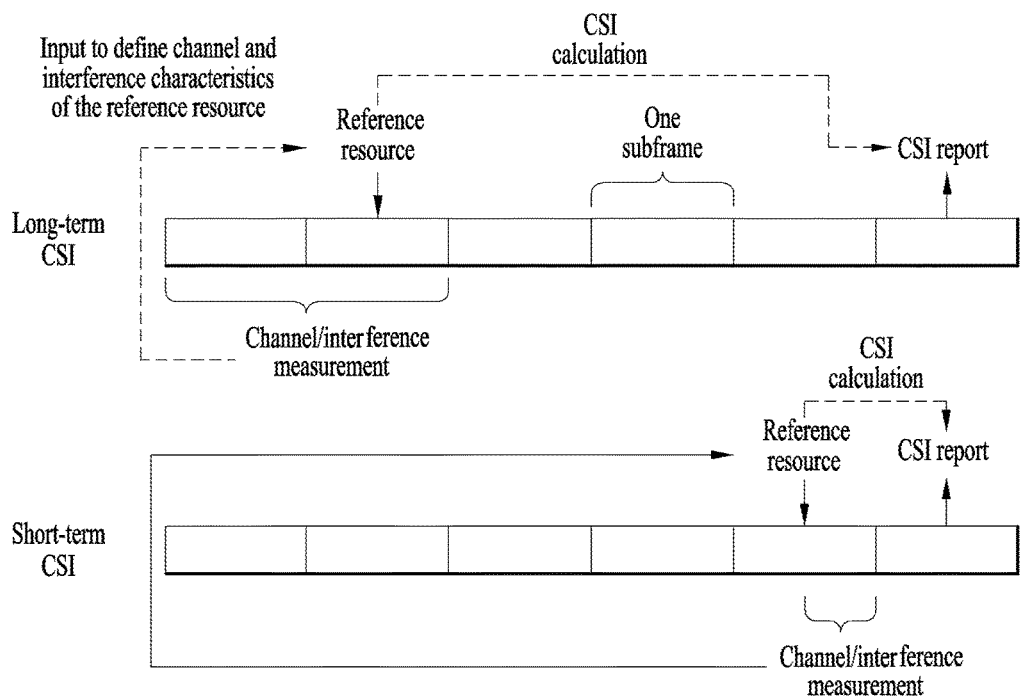
FIG. 13 is a diagram for comparing long-term CSI with short-term CSI proposed in the present invention.

FIG. 13 is a diagram for comparing long-term CSI with short-term CSI proposed in the present invention.

Referring to FIG. 13, the long-term CSI uses measurement values measured at a plurality of subframes and measures CSI at all available symbols even in a single subframe. On the contrary, the short-term CSI has a characteristic of using a measurement value only measured on a partial OFDM symbol near the timing of reporting CSI. In case of a reference resource corresponding to a reference for calculating CSI, the long-term CSI uses a timing prior to the timing of reporting the CSI as much as several ms for sufficient UE processing time. On the contrary, the short-term CSI puts a reference resource at timing as close as possible (e.g., a subframe in which the short-term CSI is transmitted or a subframe immediately before the subframe in which the short-term CSI is transmitted) from the timing of reporting the CSI to quickly report an interference state and calculates CSI on the basis of the reference resource.

A reference resource configured by a transmission unit of a general PDSCH may not exist according to a detail form of the short-term CSI. In particular, if the short-term CSI is measured on a partial OFDM symbol only and/or the short-term CSI is simply represented by such a numerical value as an absolute value of interference and/or channel estimation value or a ratio of the interference and/or channel estimation value instead of being represented by PDSCH modulation and coding scheme (MCS) capable of being decoded by a certain BLER of a UE, the reference resource may not exist.

As one of characteristics for distinguishing the short-term CSI from the long-term CSI, since the long-term CSI is mainly used for link adaptation in a state that a serving eNB occupies a channel, interference measured in the state that the serving eNB occupies the channel (and, interference measured in a state that other devices stop transmission by a listen-before-talk operation) is used only for calculating CSI. On the contrary, since the short-term CSI corresponds to CSI for determining whether or not a channel is currently idle, although the serving eNB does not occupy a channel, CSI is calculated by utilizing the short-term CSI for interference measurement. In other word, a UE measures the short-term CSI and reports the short-term CSI before the serving eNB occupies a channel, determines whether or not a channel is occupied by the serving eNB based on the short-term CSI, and determines whether to transmit PDSCH to the UE. When the PDSCH is transmitted, MCS is configured using the long-term CSI which is measured in the state that the serving eNB occupies a channel.

The short-term CSI is meaningful only when channel/interference measurement, CSI calculation, and reporting to an eNB are quickly performed. Hence, UE processing time for calculating and reporting RI/PMI/CQI may not be sufficient enough. In case of the short-term CSI, it is preferable to simplify the calculation of the short-term CSI, terminate the calculation with the insufficient processing time, and quickly report the short-term CSI to the eNB.

As an example, the short-term CSI may simply calculate and report CQI only based on strength of a channel and interference without reporting RI and PMI. In addition, in order to reduce complexity of calculating the CQI, it may be able to select a part of CQI candidates only from among the CQI candidates used for the long-term CSI and configure the selected CQI candidates as CQI candidate of the short-term CSI.

As a different example, the short-term CSI may report RSSI (in order to distinguish the RSSI from RSSI measured for a plurality of subframes via a legacy RRM process, this RSSI can be referred to as a short-term RSSI) measured from a measurement section to an eNB and may be able to make the eNB identify a currently examined interference level. In this case, in order to use a report format identical to RSRQ (reference signal received quality) reported via the legacy RRM process, it may be able to report short-term RSRQ which is represented by a ratio of legacy RSRP to the short-term RSSI. RSRP (reference signal received power) measured from a plurality of subframes is used as the numerator of the short-term RSRQ. This is because a reference signal capable of measuring RSRP does not exist in a section at which the short-term RSSI is measured. Moreover, since a UE reports the RSRP via the legacy RRM process, an eNB receives the short-term RSRQ and may be then able to perform back tracking on the short-term RSSI.

<Reporting Scheme of Short-Term CSI>

The short-term CSI calculated by the aforementioned process can be transmitted to the eNB using a legacy periodic CSI or an aperiodic CSI. However, the legacy periodic CSI or the aperiodic CSI may cause a certain transmission delay to the short-term CSI. In case of the periodic CSI, time to a periodically appearing CSI transmission opportunity directly leads to the transmission delay. In order to overcome the transmission delay, it may configure a period at which the CSI transmission opportunity appears to be very short (as an extreme case, 1 ms). Yet, the configuration may cause excessive signaling overhead. In case of the aperiodic CSI, since it takes time for receiving a CSI triggering message from an eNB and transmitting PUSCH according to the CSI triggering message, it also leads to the transmission delay. Hence, it may be preferable to select a method rather than the legacy CSI transmission method.

As an example, a UE may be able to transmit the short-term CSI using a physical layer parameter of a signal to be transmitted. In particular, the UE selects the physical layer parameter of the transmission signal based on the short-term CSI to be transmitted and an eNB estimates the short-term CSI to be reported by the UE based on a parameter used for transmitting the signal.

In this case, as an embodiment of an available transmission signal, it may use HARQ-ACK which is transmitted by a UE to indicate whether or not decoding of PDSCH is successful. If the short-term CSI reported by the UE is quantized by N number of sections, it may select N number of resources capable of being used for transmitting the HARQ-ACK at specific timing and the HARQ-ACK is transmitted using a resource interlocked with the short-term CSI reported by the UE at the specific timing. An eNB estimates the short-term CSI reported by the UE based on a resource at which the HARQ-ACK is received.

More specifically, if the short-term CSI is divided into two sections, it may indicate that the UE reports information on whether or not a current channel is idle or busy via the short-term CSI. Hence, two resources in every HARQ-ACK timing are divided into a resource used for a busy channel and a resource used for an idle channel. Of course, a method of selecting a resource according to the short-term CSI measured by the UE can also be applied to a different uplink signal. Regarding this, it shall be described later together with an embodiment of a different signal.

When a UE reports a short-term CSI, it may also use a legacy CSI feedback scheme. In this case, in order to reduce the aforementioned CSI delay, various types of long-term CSI are calculated in advance according to interference strength and a type of long-term CSI to be finally reported through the short-term CSI can be selected from among the various types. As an example, a UE measures the total N number of long-term CSIs and each of the CSIs can be calculated based on interference which is measured when short-term interference exists in a certain area only. Regarding this, it shall be described with reference to the drawing.

Figure 14:
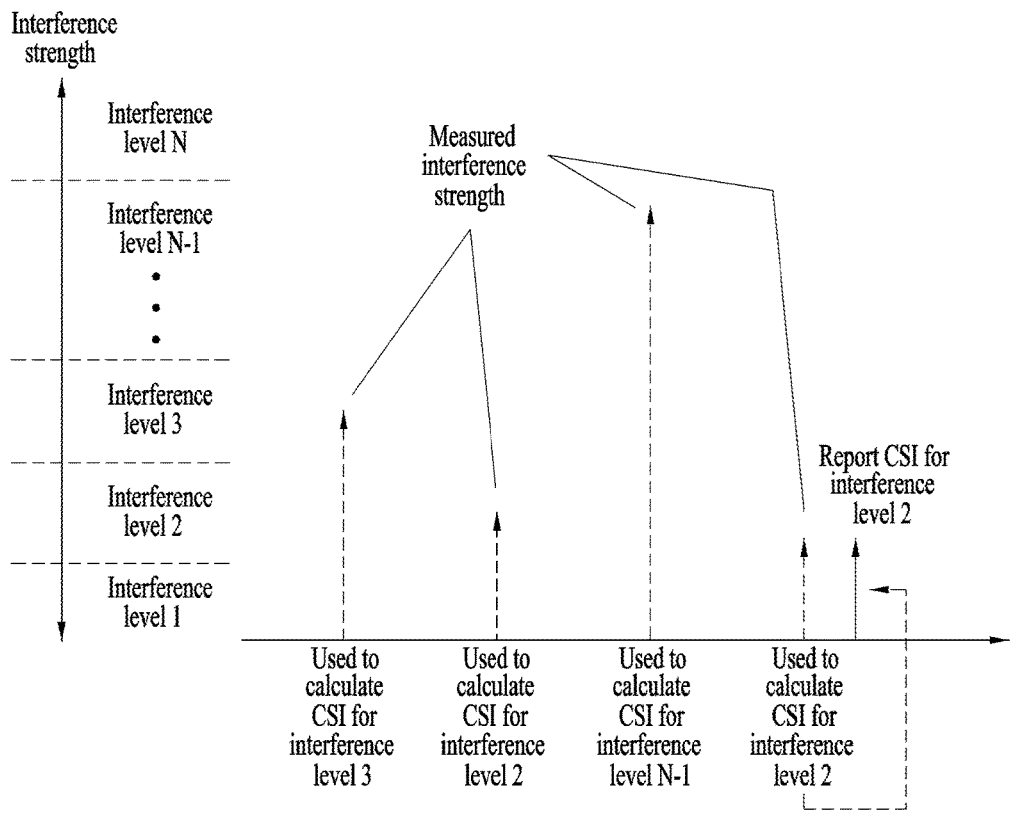
FIG. 14 is a diagram for an example of reporting short-term CSI according to embodiment of the present invention.

FIG. 14 is a diagram for an example of reporting short-term CSI according to embodiment of the present invention.

Referring to FIG. 14, the entire interference strength is divided into N sections and each of the N sections is referred to as level n interference. In this case, RSSI may become a reference for measuring interference strength. If strength of short-term interference, which is measured at the time of measuring interference, is included in a level n, a level n long-term CSI is calculated by combining the measurement value with a measurement value of the legacy level n interference. Subsequently, if strength of short-term interference, which is measured immediately before a CSI reporting timing, corresponds to m section, a UE reports m section long-term CSI.

Referring to FIG. 14, since interference recently measured for four times correspond to level 3, 2, N−1, and 2, respectively, and a value measured immediately before CSI report belongs to the level 2, the UE reports the level 2 long-term CSI. In other word, the UE measures short-term CSI and informs an eNB of long-term CSI closest to the measured short-term CSI. The eNB is able to schedule PDSCH transmission using the reported CSI. When the aforementioned operation is performed, in order to make the eNB know an interference level measured in the shot-term CSI, similar to the HARQ-ACK, it may be able to determine a position of a resource used for transmitting CSI according to a short-term CSI value (in this case, it can be interpreted as a measured short-term interference or RSSI level as well).

As a specific method of reporting short-term CSI to an eNB, a UE measures interference corresponding to the short-term CSI in a state that long-term CSI according to each interference level is measured and the UE can report long-term CSI itself corresponding to the measured interference. Or, the UE preferentially measures long-term CSI in accordance with each interference level and reports the measured long-term CSI to the eNB. Subsequently, the UE measures interference corresponding to short-term CSI and may be then able to report an interference level of the interference corresponding to the long-term CSI to the eNB.

Meanwhile, when a UE reports short-term CSI, it may also be able to use an SRS. In particular, unlike the HARQ-ACK or the CSI, since the SRS uses a partial symbol only (i.e., the last symbol) of a subframe, it may be able to minimize time necessary for transmitting CSI itself. In this case, information of the short-term CSI can be reported to an eNB based on a physical layer parameter used for transmitting the SRS. In particular, it may be able to differently determine a sequence generation seed value, a set of RBs, a comb index, and a time resource location represented in a unit of a subframe or a symbol of the SRS according to the short-term CSI value measured by the UE. Of course, as a general meaning, it may be able to use a sequence of a different type, which is determined in advance and transmitted using a partial symbol of a form similar to the SRS, to transmit the short-term CSI.

In particular, in case of the SRS, the physical layer parameter can include SRS transmit power. In particular, the transmit power of the SRS can be differently configured according to the short-term CSI value measured by the UE. As an example, similar to the contents of FIG. 14, total interference strength is divided into N levels. If a level of short-term interference corresponds to a level n, it may be able to control the transmit power of the SRS by applying level n SRS power offset to the transmit power of the SRS.

As an extreme case, it may be able to report an interference level using information on whether or not the SRS is transmitted (i.e., information on whether or not power is zero or information on whether or not power is applied).

Specifically, the transmit power of the SRS may become weaker as the short-term interference is getting stronger. In the aspect of an eNB, if the SRS is received with stronger power, the eNB may be able to determine it as the short-term interference of the UE is weaker and a channel state with the UE is better. As an example of the aforementioned operation, a UE may have two interference levels. If one channel is busy, the UE is able to configure another channel to be idle. In this case, if it is determined as a channel is busy due to the high short-term interference, the UE sets the transmit power of the SRS to 0 to terminate SRS transmission. On the contrary, if it is determined as a channel is idle due to the low short-term interference, the UE can transmit the SRS with power determined according to a prescribed rule. In this case, the eNB can determine whether a channel is idle or busy in the aspect of the UE based on whether or not the SRS is received.

Figure 15:
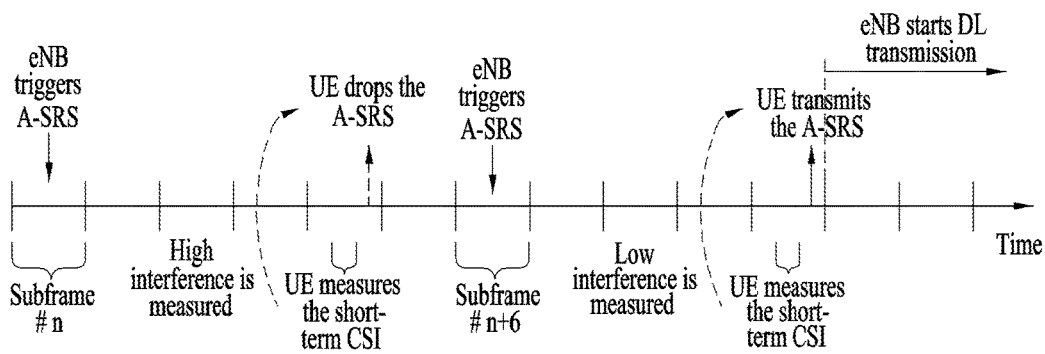
FIG. 15 is a diagram for an example of reporting short-term CSI using an SRS according to embodiment of the present invention.

FIG. 15 is a diagram for an example of reporting short-term CSI using an SRS according to embodiment of the present invention. In particular, FIG. 15 shows an example that a short-term CSI report is performed in a form of strong interference and low interference via information on whether or not an SRS is transmitted.

Referring to FIG. 15, first of all, the eNB triggers an aperiodic SRS while having data to be transmitted to a specific UE in a subframe #n and receives short-term CSI reported by the UE. The UE identifies occurrence of aperiodic SRS transmission in a subframe #n+4 according to a timeline of the aperiodic SRS and measures the short-term CSI. In this case, assume that the short-term CSI is measured in a partial symbol of a subframe in which the SRS is transmitted.

The UE measures the short-term CSI in the subframe #n+4, identifies interference of the short-term CSI belonging to a high level, and cancels SRS transmission in the subframe #n+4. Subsequently, the eNB knows that the SRS triggered by the eNB is cancelled in the subframe #n+4 and determines it as the short-term CSI is high interference. The eNB does not initiate DL transmission. The eNB triggers the aperiodic SRS again in a subframe #n+6. The UE measures the short-term CSI measured as low interference in a subframe #n+10 and transmits SRS. Having received the SRS, the eNB identifies that the UE currently has no strong interference. The eNB initiates DL transmission to the UE through an unlicensed band from a subframe #n+11.

In the example of FIG. 15, although it is assumed that SRS transmission timing appears after aperiodic SRS trigger 4 ms under an assumption of aperiodic SRS triggering included in general DL assignment or UL grant, by which the principle of the present invention may be non-limited. In particular, in order to more quickly secure an SRS transmission opportunity in an unlicensed band, it may be able to introduce a new aperiodic SRS triggering method that a time interval shorter than 4 ms appears between aperiodic SRS trigger of the eNB and SRS transmission timing. In this case, in order to prevent a case that time necessary for a UE to process PDSCH and/or PUSCH is practically reduced, the aperiodic SRS triggering of a short interval may have a characteristic that the aperiodic SRS triggering is transmitted via a triggering message of a special type, i.e., PDCCH assigning no PDSCH or PUSCH.

The PDCCH can be distinguished from a legacy general DL assignment and a UL grant through a separate indicator added to a previously not used DCI format or a legacy DCI format or a CRC masked with separately assigned RNTI rather than C-RNTI. Or, the PDCCH can be distinguished from a legacy general DL assignment and a UL grant through DL assignment or a UL grant that allocating no resource by setting all resource assignment fields to 0. Of course, it may use a periodic SRS, which designates an SRS transmission resource in advance via higher layer signaling, to prevent time delay caused by a triggering message.

As mentioned in the foregoing description, if the eNB receives the short-term CSI, the eNB should reflect the short-term CSI immediately and initiate PDSCH transmission to the UE. In this case, in order for the eNB to detect and process the CSI, a certain amount of processing time is required. The processing time can be secured in a manner that the eNB appropriately assigns TA (timing advance) to the UE.

Figure 16:
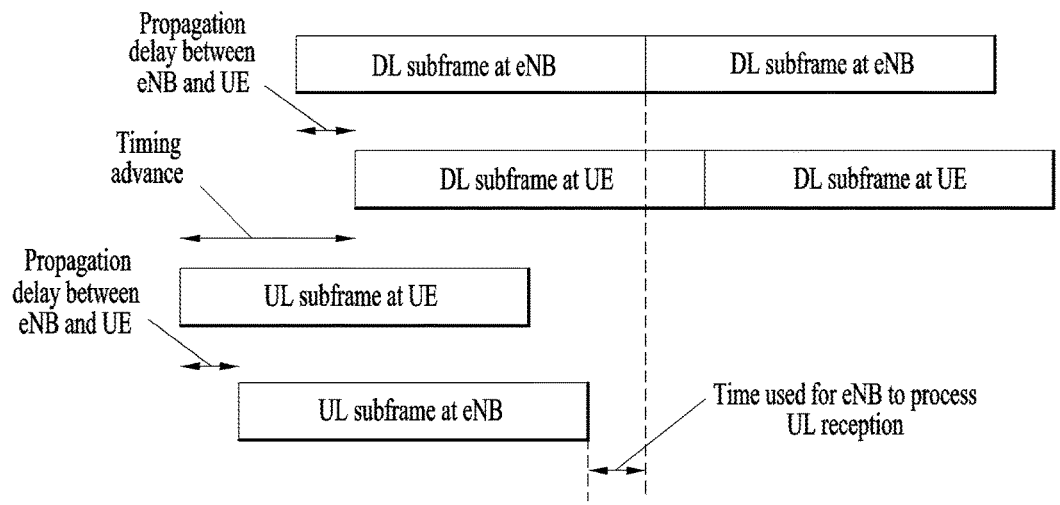
FIG. 16 is a diagram for an example of applying a TA in response to short-term CSI according to embodiment of the present invention.

FIG. 16 is a diagram for an example of applying a TA in response to short-term CSI according to embodiment of the present invention.

Referring to FIG. 16, If a TA value equal to or greater than a TA value capable of compensating propagation delay between the eNB and the UE is applied, it is able to secure a certain amount of processing time before DL transmission is initiated in an unlicensed band after a UL signal including the short-term CSI is received from the UE.

Figure 17:
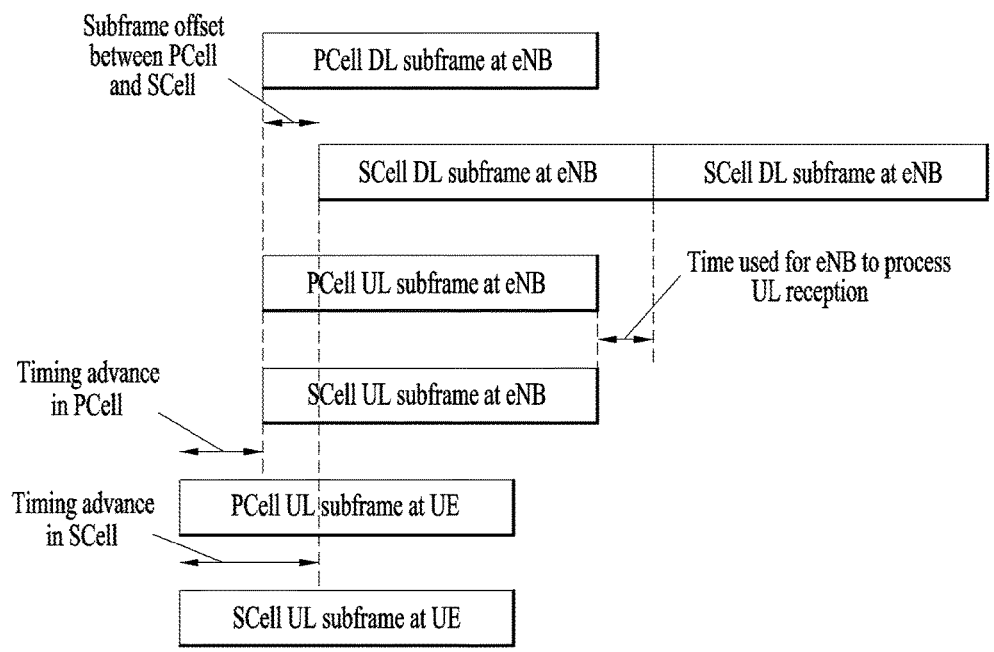
FIG. 17 is a diagram for a different example of applying a TA in response to short-term CSI according to embodiment of the present invention.

FIG. 17 is a diagram for a different example of applying a TA in response to short-term CSI according to embodiment of the present invention.

Referring to FIG. 17, if the short-term CSI is reported to a PCell located at a licensed band, it may be able to secure the processing time of the eNB by putting offset as much as prescribed time between a DL subframe boundary of a SCell and a DL Pcell. In this case, in case of performing UL transmission between the PCell and the SCell, although a timing advance value respectively applied to the PCell and the SCell is different, this is because of the offset of a DL subframe boundary between the PCell and the SCell. Except the offset, timing advance can be identical to each other. As a result, UL signals of the PCell and the SCell can be transmitted at the same time. In this case, the PCell and the SCell operate by an identical timing advance command. Yet, a prescribed offset can be applied to the final timing advance of the SCell. To this end, the eNB may inform the UE of an offset value of timing advance of the SCell managed in an unlicensed band compared to the PCell or an offset value of the subframe boundary to help the UE perform an appropriate operation.

<Coordination Between eNB and UE Using Short-Term CSI>

In the foregoing description, if short-term CSI transmitted by a specific UE is detected by a different UE or an eNB, it may indicate that DL transmission to the UE is initiated in a minute. As an example, if the different UE or the eNB receives the short-term CSI indicating a low interference level, it can be considered as a notification notifying that DL transmission to the UE is initiated in a minute. In particular, as mentioned earlier in the example of FIG. 15, when a UE reports short-term CSI via information on whether or not an SRS is transmitted (or, a size of transmit power of the SRS), if a different adjacent UE or an eNB detects the short-term CSI, the aforementioned interpretation is more supportive. Having detected the short-term CSI, the different UE or the eNB may perform an interference coordination operation for a prescribed period to terminate DL transmission to protect DL reception of the UE.

Figure 18:
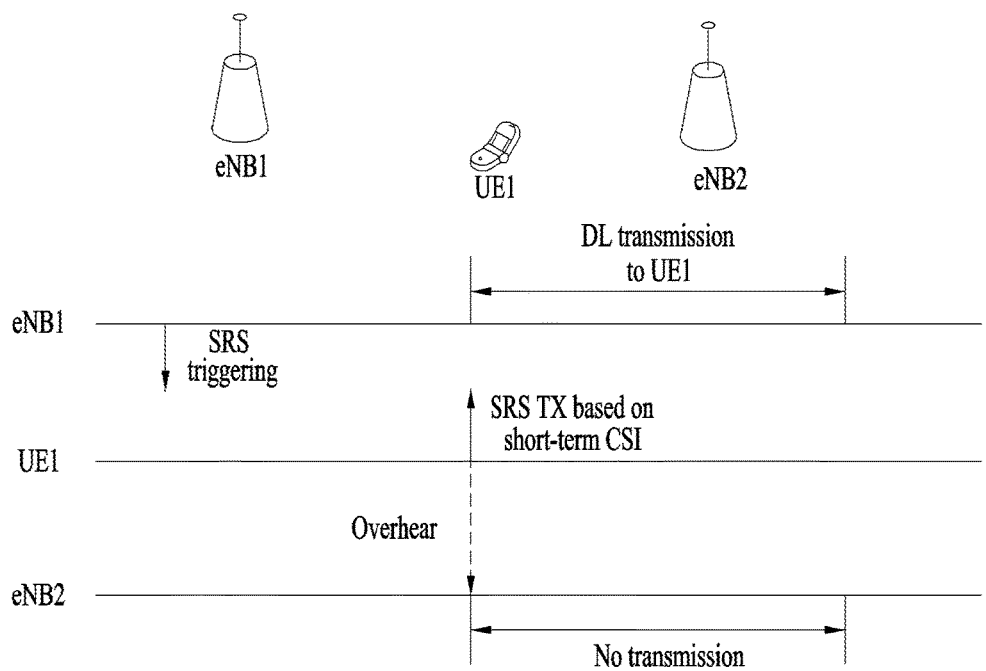
FIG. 18 is a diagram for an example of a coordination operation according to short-term CSI in accordance with embodiment of the present invention.

FIG. 18 is a diagram for an example of a coordination operation according to short-term CSI in accordance with embodiment of the present invention.

Referring to FIG. 18, a UE1 transmits an SRS triggered by an eNB1 based on short-term CSI measured by the UE1. An eNB2 receives the SRS and terminates DL transmission for a prescribed time period to protect a DL signal transmitted to the UE1 by the eNB1. In order to smoothly perform the operation, the eNB1 can forward various parameters of a UL signal to be used for reporting the short-term CSI such as HARQ-ACK, CSI, a position of a time/frequency resource to be used for transmitting an SRS, a position of a resource interlocked with each short-term CSI level when the short-term CSI is represented by a resource position, a sequence generation seed value to be used for an SRS, and the like to the eNB2.

An operation shown in FIG. 18 can also be efficiently utilized for a case that priority of resource utilization is assigned between eNBs. As an example, two eNBs adjacent to each other may negotiate in advance that all resources are divided into two parts and each of the eNBs has priority on the use of one part. However, if a resource prioritized by a different eNB is not usable all the time, it may decrease overall resource utilization. Hence, if a resource is known as not being used by the different eNB, it may be preferable to use the resource by an eNB not having priority on the resource. In this case, it is able to identify whether or not the resource is used by the eNB having priority on the resource based on short-term CSI transmitted by the eNB or a UE connected with the eNB.

As an example, in case of reporting short-term CSI based on information on whether or not an SRS is transmitted, in the aspect of a specific eNB1, when priority for a specific resource is possessed by a neighboring eNB2, if a UE connected with the eNB2 detects an SRS, which is transmitted as the short-term CSI, immediately before the resource, the eNB1 considers it as the eNB2 uses the resource and waits while terminating transmission. If the UE connected with the eNB2 fails to detect the SRS, the eNB1 may use the resource for DL transmission although the eNB1 has no priority on the resource. Of course, if the eNB1 has priority on a resource, the eNB1 omits a process of receiving short-term CI from a UE connected with a neighboring eNB in the resource and may use the resource for DL transmission all the time (except a case that a device rather than LTE system occupies a channel).

Figure 19:
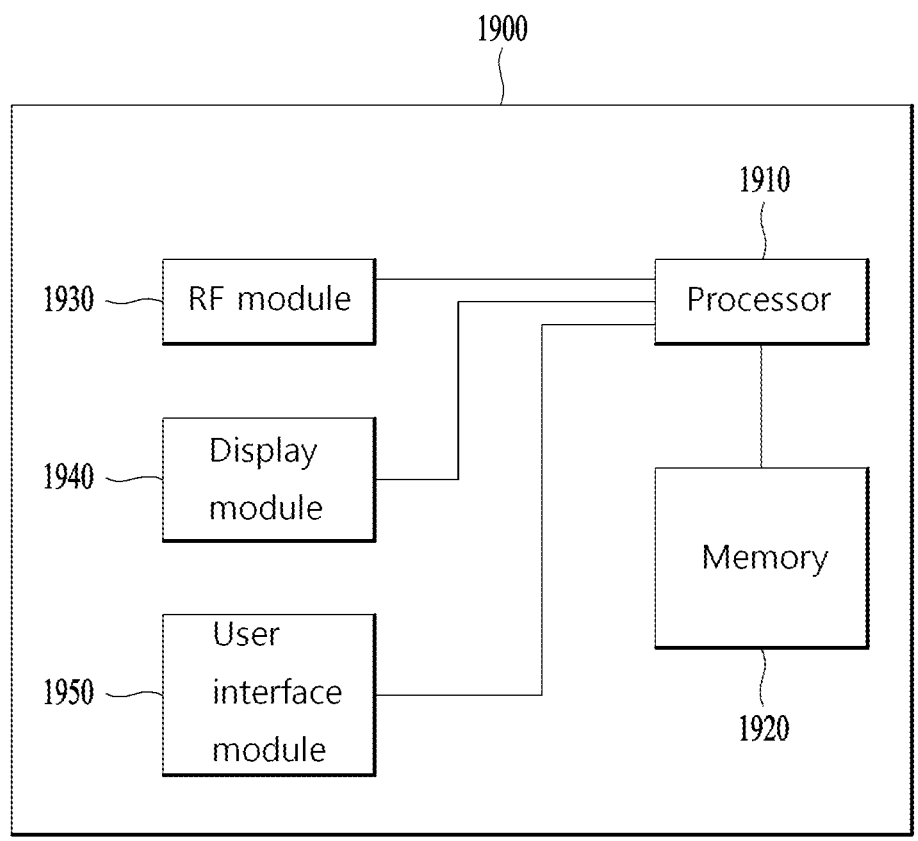
FIG. 19 is a block diagram for a communication device according to one embodiment of the present invention.

FIG. 19 is a block diagram for a communication device according to one embodiment of the present invention.

Referring to FIG. 19, a communication apparatus 1900 includes a processor 1910, a memory 1920, an RF module 1930, a display module 1940, and a User Interface (UI) module 1950.

The communication device 1900 is shown as having the configuration illustrated in FIG. 19, for the convenience of description. Some modules may be added to or omitted from the communication apparatus 1900. In addition, a module of the communication apparatus 1900 may be divided into more modules. The processor 1910 is configured to perform operations according to the embodiments of the present invention described before with reference to the drawings. Specifically, for detailed operations of the processor 1910, the descriptions of FIGS. 1 to 18 may be referred to.

The memory 1920 is connected to the processor 1910 and stores an Operating System (OS), applications, program codes, data, etc. The RF module 1930, which is connected to the processor 1910, upconverts a baseband signal to an RF signal or downconverts an RF signal to a baseband signal. For this purpose, the RF module 1930 performs digital-to-analog conversion, amplification, filtering, and frequency upconversion or performs these processes reversely. The display module 1940 is connected to the processor 1910 and displays various types of information. The display module 1940 may be configured as, not limited to, a known component such as a Liquid Crystal Display (LCD), a Light Emitting Diode (LED) display, and an Organic Light Emitting Diode (OLED) display. The UI module 1950 is connected to the processor 1910 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of reporting channel state information on an unlicensed band in a wireless communication system and an apparatus therefor are described with reference to examples applied to 3GPP LTE system, it may be applicable to various kinds of wireless communication systems as well as the 3GPP LTE system.

What is claimed is:

1. A method of reporting channel state information on an unlicensed band by a user equipment to an evolved Node B (eNB) in a wireless communication system, the method comprising:

receiving a triggering message of a sounding reference signal from the eNB to report the channel state information on the unlicensed band;

measuring interference on the unlicensed band;

determining a transmit power of the sounding reference signal according to the measured interference; and if the interference measured on the unlicensed band is less than a threshold value, transmitting the sounding reference signal for reporting the channel state information on the unlicensed band to the eNB according to the determined transmit power, wherein the channel state information on the unlicensed band is transmitted using a specific symbol of a subframe on which the sounding reference signal is transmitted.

2. The method of claim 1, wherein if the interference measured on the unlicensed band is equal to or greater than the threshold value, transmission of the sounding reference signal for reporting the channel state information on the unlicensed band is dropped.

3. The method of claim 1, wherein if a different eNB detects the sounding reference signal for reporting the channel state information on the unlicensed band, downlink transmission of the different eNB on the unlicensed band is terminated for a predetermined period.

4. The method of claim 1, wherein if the sounding reference signal for reporting the channel state information on the unlicensed band is received, the eNB performs downlink transmission to the user equipment on the unlicensed band.

5. The method of claim 4, wherein the sounding reference signal for reporting the channel state information on the unlicensed band applies an additional timing advance to a timing advance for uplink transmission to perform downlink transmission processing in the eNB.

6. A user equipment in a wireless communication system, the user equipment comprising:

a transceiver configured to transceive a signal with an evolved Node B (eNB); and a processor configured to process the signal, wherein the processor is further configured to:

control the transceiver to receive a triggering message of a sounding reference signal from the eNB to report channel state information on an unlicensed band, measure interference on the unlicensed band, determine a transmit power of the sounding reference signal according to the measured interference, and if the interference measured on the unlicensed band is less than a threshold value, control the transceiver to transmit the sounding reference signal for reporting the channel state information on the unlicensed band to the eNB according to the determined transmit power, and wherein the channel state information on the unlicensed band is transmitted using a specific symbol of a subframe on which the sounding reference signal is transmitted.

7. The user equipment of claim 6, wherein if the interference measured on the unlicensed band is equal to or greater than the threshold value, the processor is further configured to drop transmission of the sounding reference signal for reporting the channel state information on the unlicensed band.

8. The user equipment of claim 6, wherein if a different eNB detects the sounding reference signal for reporting the channel state information on the unlicensed band, downlink transmission of the different eNB on the unlicensed band is terminated for a predetermined period.

9. The user equipment of claim 6, wherein if the sounding reference signal for reporting the channel state information on the unlicensed band is received, the eNB performs downlink transmission to the user equipment on the unlicensed band.

10. The user equipment of claim 9, wherein the processor is further configured to apply an additional timing advance to a timing advance for uplink transmission to perform downlink transmission processing in the eNB in response to the sounding reference signal for reporting the channel state information on the unlicensed band.

* * * * *